United States Patent
Brewer et al.

(10) Patent No.: US 12,163,764 B2
(45) Date of Patent: Dec. 10, 2024

(54) SYSTEM AND METHOD FOR NAVIGATION AND TARGETING IN GPS-CHALLENGED ENVIRONMENTS USING FACTOR GRAPH OPTIMIZATION

(71) Applicant: Rockwell Collins, Inc., Cedar Rapids, IA (US)

(72) Inventors: Eric Brewer, Ashburn, VA (US); Vladislav Gavrilets, McLean, VA (US); William T. Kirchner, Ashburn, VA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 394 days.

(21) Appl. No.: 17/587,926

(22) Filed: Jan. 28, 2022

(65) Prior Publication Data
US 2023/0243623 A1  Aug. 3, 2023

(51) Int. Cl.
  *F41G 7/36* (2006.01)
  *F41G 7/34* (2006.01)

(52) U.S. Cl.
  CPC ............... *F41G 7/36* (2013.01); *F41G 7/343* (2013.01); *F41G 7/346* (2013.01)

(58) Field of Classification Search
  CPC ............. F41G 7/36; F41G 7/343; F41G 7/346
  See application file for complete search history.

(56) References Cited

U.S. PATENT DOCUMENTS

| | | | |
|---|---|---|---|
| 6,876,945 B2 | 4/2005 | Emord | |
| 7,289,906 B2 | 10/2007 | Merwe et al. | |
| 7,911,380 B2 | 3/2011 | Petillon | |
| 8,676,498 B2* | 3/2014 | Ma | G05D 1/027 353/30 |
| 9,423,509 B2 | 8/2016 | Georgy et al. | |
| 9,488,480 B2 | 11/2016 | Georgy et al. | |
| 9,596,073 B1 | 3/2017 | Reyes et al. | |
| 11,550,067 B2* | 1/2023 | Reimer | G01S 19/54 |
| 11,914,053 B2* | 2/2024 | Kumar | G01S 13/935 |
| 2017/0053536 A1* | 2/2017 | Wright | G05D 1/00 |
| 2018/0161986 A1 | 6/2018 | Kee et al. | |
| 2019/0346271 A1* | 11/2019 | Zhang | G01C 21/1656 |

(Continued)

OTHER PUBLICATIONS

Dellaert et al., "Factor Graphs for Robot Perception", Foundations and Trends® in Robotics: vol. 6: No. 1-2, pp. 1-139. http://dx.doi.org/10.1561/2300000043, (2017).

(Continued)

*Primary Examiner* — Marcus E Windrich
(74) *Attorney, Agent, or Firm* — Suiter Swantz IP

(57) ABSTRACT

A system and method for enhanced aircraft-based targeting senses RF emissions or other signals associated with a target while navigating a trajectory through a GPS-challenged airspace. While the target is being observed, the aircraft targeting system tracks GPS-challenged state vectors (e.g., via an onboard inertial reference system) and pressure altitudes consistent with each observation. When the aircraft emerges from the GPS-challenged airspace, the targeting system determines multiple GPS-driven subsequent absolute positions of the aircraft. The targeting system determines a refined estimate of the target location via batch factor graph optimization of measurements taken while inside and outside of the GPS-challenged airspace.

15 Claims, 9 Drawing Sheets

(56) References Cited

U.S. PATENT DOCUMENTS

| | | | | |
|---|---|---|---|---|
| 2019/0378423 | A1* | 12/2019 | Bachrach | H04L 67/52 |
| 2020/0324898 | A1* | 10/2020 | Youmans | G01C 21/005 |
| 2021/0293546 | A1 | 9/2021 | Zhang et al. | |
| 2021/0300587 | A1 | 9/2021 | Alberda | |
| 2021/0311203 | A1* | 10/2021 | Reis | G01S 19/215 |
| 2021/0373157 | A1* | 12/2021 | Pierrottet | G01S 17/58 |
| 2022/0365165 | A1 | 11/2022 | Kirchner et al. | |
| 2022/0411053 | A1* | 12/2022 | Baumgartner | F41G 3/165 |
| 2024/0067371 | A1* | 2/2024 | Turner | B64U 80/40 |

OTHER PUBLICATIONS

Dellaert, Frank, Factor Graphs and GTSAM: A Hands-on Introduction, GT RIM, GT-RIM-CP\&R-2012-002, Sep. 2012.

U.S. Appl. No. 17/320,707 filed May 14, 2021, Kirchner et al.

Forster, et al,. IMU Preintegration on Manifold for Efficient Visual-Inertial Maximum-a-Posteriori Estimation. 10.15607/RSS.2015.XI. 006. (2015).

Kaess et al., "iSAM: Incremental Smoothing and Mapping," in IEEE Transactions on Robotics, vol. 24, No. 6, pp. 1365-1378, Dec. 2008, doi: 10.1109/TRO.2008.2006706.

Lupton et al., Visual-Inertial-Aided Navigation for High-Dynamic Motion in Built Environments Without Initial Conditions. IEEE Transactions on Robotics. 28. 61-76. 10.1109/TRO.2011.2170332. (2012).

Wen et al., "Factor graph optimization for GNSS/INS integration: A comparison with the extended Kalman filter". Navigation, 2021; 68( 2): 315-331. https://doi.org/10.1002/navi.421.

Wen et al., "Performance Comparison of GNSS/INS Integrations Based on EKF and Factor Graph Optimization," Proceedings of the 32nd International Technical Meeting of the Satellite Division of The Institute of Navigation (ION GNSS+ 2019), Miami, Florida, Sep. 2019, pp. 3019-3032. https://doi.org/10.33012/2019.17129.

Wu, Xiwei et al., "Factor graph based navigation and positioning for control system design: A review, Chinese Journal of Aeronautics", 2021.ISSN 1000-9361, https://doi.org/10.1016/j.cja.2021.09.001. (https://www.sciencedirect.com/science/article/pii/S1000936121002703).

Extended European Search Report dated Jul. 18, 2023; European Application No. 23152957.9.

Gong Zheng et al. "Graph-Based Adaptive Fusion of GNSS and VIO Under Intermittent GNSS-Degraded Environment", IEEE Transactions on Instrumentation and Measurement, IEEE, USA, vol. 70, Nov. 24, 2020.

Rik B\"Ahnemann et al: "Under the Sand: Navigation and Localization of a Micro Aerial Vehicle for Landmine Detection with Ground Penetrating Synthetic Aperture Radar", Arxiv. Org, Cornell University Library, 201 Oline Library Cornell University, Ithaca, NY 14853, Dec. 5, 2021.

Sajad Saeedi et al, "Multiple-Robot Simultaneous Localization and Mapping: A Review: Multiple-Robot Simultaneous Localization and Mapping", Journal of Field Robotics, vol. 33, No. 1, Jan. 1, 2016.

\* cited by examiner

720 — Receiving, subsequent to exiting the GPS-challenged airspace, one or more second state vectors from at least one second aircraft, the one or more second state vectors including GPS-challenged state vectors and subsequent state vectors corresponding to the at least one second aircraft 722 — Receiving, subsequent to exiting the GPS-challenged airspace, second targeting information from the at least one second aircraft, the second targeting information including GPS-challenged targeting information and subsequent targeting information corresponding to the at least one second aircraft 724 — Receiving, subsequent to exiting the GPS-challenged airspace, one or more second subsequent absolute positions from the at least one second aircraft 726 — Determining at least one vector between the first aircraft and the at least one second aircraft via two-way timing and ranging (TWTR), the at least one vector associated with one or more of a direction or a distance

FIG. 7C

SYSTEM AND METHOD FOR NAVIGATION AND TARGETING IN GPS-CHALLENGED ENVIRONMENTS USING FACTOR GRAPH OPTIMIZATION

BACKGROUND

Providing aircraft-based precision navigation and targeting solutions can be difficult within airspaces wherein the use of global positioning systems (GPS; or other like satellite-based navigational systems) and/or communications ("comms") systems is challenged or denied, e.g., by hostile jamming. This is especially true for multi-platform targeting approaches such as Time Difference of Arrival (TDoA). TDoA requires mobile platforms to observe a signal (e.g., an emission from a target of interest) at multiple locations while having knowledge of their own ("ownship") position/navigation/time (PNT) solution. While traversing airspaces wherein GPS and/or comms are unavailable, platforms may make observations of a target without access to a precise ownship PNT solution. For example, inertial measurement units (IMU) may not require external signals to determine a relative position and/or orientation of a platform, but inherent drift associated with IMUs, even at navigation-grade quality, will cause targeting information to quickly become erroneous and unreliable.

While Kalman filters (and extended Kalman filters (EKF)) run forward and backward can provide a means for smoothing of navigational data (e.g., correcting past positional data by projecting current, more precise data backwards in time), EKF-based approaches have a limited time horizon and thus may not perform well under extended time windows where the state deviates from the linearization point, or where measurements may not assume a random distribution of Gaussian noise.

SUMMARY

In a first aspect, a method for aircraft-based GPS-challenged targeting and navigation is disclosed. In embodiments, the method includes entering, navigating a trajectory through, and exiting a GPS-challenged airspace wherein availability of absolute positioning via received satellite-based navigational signals may be compromised, unreliable, or denied entirely. The method includes, while the aircraft navigates a trajectory through the GPS-challenged airspace, determining target information by sensing observable signals associated with a target of interest, the target having a target location. For example, targeting information may be GPS-challenged (e.g., corresponding to sensings of observable signals within the GPS-challenged airspace) or subsequent (e.g., corresponding to sensings after emerging from the GPS-challenged airspace). The method includes determining, via an aircraft-based inertial reference system (IRS), a state vector of the aircraft associated with each sensing of observable signals; the state vectors may similarly be GPS-challenged or subsequent. The method includes storing the determined state vectors and associated targeting information to memory. The method includes exiting the GPS-challenged airspace. The method includes determining, via an aircraft-based GPS receiver or like absolute positioning system and after the aircraft has exited the GPS-challenged airspace, a series of subsequent absolute positions of the aircraft, each subsequent absolute position also associated with a subsequent state vector and with subsequent sensing of observable signals (e.g., subsequent targeting information). The method includes determining, via an aircraft-based navigation and targeting system, a targeting solution geolocating the target of interest as observed by the aircraft along the trajectory through the GPS-challenged airspace via factor graph optimization of the set of state vectors (GPS-challenged and subsequent) and corresponding targeting information based on the subsequent absolute positions of the aircraft (and the set of state vectors and targeting information corresponding thereto).

In some embodiments, a state vector includes a relative position of the aircraft, an orientation of the aircraft in multiple degrees of freedom (e.g., absolute or relative), or a pressure altitude of the aircraft.

In some embodiments, a state vector includes a rate of change of the position, orientation, or pressure altitude.

In some embodiments, RF observation of the target includes passive sensing of RF emissions, received RF signals, and/or electro-optical infrared (EO/IR) imagery via aircraft-based passive sensors.

In some embodiments, RF observation of the target includes transmitting or emitting signals or beams (e.g., surveillance radar, synthetic aperture radar) and observing a subsequent reflection of (or receiving a response to) the signal or beam.

In some embodiments, the method further includes transmitting ranging signals from the aircraft, receiving responses to the ranging signals from ground stations with known locations (e.g., fixed or mobile), and determining distance and/or direction between the aircraft and the ground station/s via radio ranging (e.g., two-way timing and ranging (TWTR)) while navigating, and subsequent to emerging from, the GPS-challenged airspace.

In some embodiments, the aircraft is one of a group of companion aircraft and the method includes receiving state vector information and targeting information (GPS-challenged and subsequent) from each companion aircraft in the group, as well as subsequent absolute position information of the companion aircraft (corresponding to the subsequent state vectors and targeting information) upon exiting the GPS-challenged airspace. The method further includes two-way timing and ranging with the other aircraft to maintain precision distance and timing, e.g., to synchronize common target observation the target at varying times each aircraft and incorporate navigation and targeting information received from the companion aircraft into the targeting solution.

In some embodiments, the group of companion aircraft numbers at least three and the target of interest is non-stationary, and the method includes determining, based on received state vectors, unique relative position information of the target associated with each target observation, such that the targeting solution includes vector information associated with the trajectory of the target while sensed by the companion aircraft from within the GPS-challenged airspace.

In some embodiments, determining the targeting solution via factor graph optimization includes determining a refined navigation solution (e.g., position/navigation/time (PNT)) of the aircraft corresponding to its trajectory through the GPS-challenged airspace.

In a further aspect, an aircraft configured for GPS-challenged targeting and navigation is also disclosed. The aircraft is configured for entering a GPS-challenged airspace, navigating a trajectory through the GPS-challenged airspace, and exiting the GPS airspace. In embodiments, the aircraft includes absolute and relative positioning systems, e.g., GPS receivers or like satellite-based navigational systems and inertial reference systems (IRS) respectively. For example, the absolute positioning systems may determine subsequent absolute positions of the aircraft after emerging from the GPS-challenged airspace, but may not be able to determine reliable absolute positions therewithin. Similarly, the IRS may determine state vectors of the aircraft, including GPS-challenged and subsequent state vectors. The aircraft includes signal sensors for sensing observable signals associated with a target of interest and thereby deriving target information (e.g., GPS-challenged targeting information based on sensings within the GPS-challenged airspace, subsequent targeting information based on sensings after emerging from the GPS-challenged airspace). The aircraft includes a navigation and targeting system including a memory for storing processor-executable instructions and processors in communication with the positioning systems and signal sensors. The memory may further be configured for storage of GPS-challenged state vectors and corresponding targeting information sensed within the GPS-challenged airspace. The navigation and targeting system may determine a targeting solution geolocating the target as observed and sensed by the aircraft within the GPS-challenged airspace via factor graph optimization (e.g., batch processing) of the determined state vectors and targeting information sensed within the GPS-challenged airspace based on numerous subsequent absolute positions of the aircraft determined after emerging from the GPS-challenged airspace (e.g., and the targeting information and state vectors corresponding thereto).

In some embodiments, the relative positioning system/ IRS includes accelerometers and barometric altimeters, such that each state vector includes a relative position of the aircraft, an orientation of the aircraft (e.g., in multiple degrees of freedom), and a pressure altitude of the aircraft, and rate gyrometers for determining rates of change in the relative position, orientation, or pressure altitude.

In some embodiments, the signal sensors include passive sensors for sending, e.g., RF emissions, received RF signals, and/or electro-optical infrared (EO/IR) emissions.

In some embodiments, the aircraft includes radio ranging (e.g., RF transmission/reception (TxRx)) components for transmitting ranging signals to ground stations having known fixed or mobile locations, receiving responses to the ranging signals from the ground stations, and maintaining precision distance and timing between the aircraft and ground stations via two-way timing and ranging (TWTR), such that factor graph optimization may incorporate GPS-challenged and/or subsequent distance and timing information.

In some embodiments, the aircraft is one of a group of companion aircraft navigating through the GPS-challenged airspace. For example, the aircraft receives GPS-challenged state vectors from each companion aircraft (as well as the corresponding GPS-challenged targeting information) and, after the companion aircraft exit the GPS-challenged airspace, the aircraft receives subsequent absolute position information determined by the companion aircraft (and the corresponding subsequent state vectors and targeting information). The aircraft maintains precision distance and timing with the companion aircraft via two-way timing and ranging (TWTR) and clock synchronization, such that the targeting solution may incorporate the GPS-challenged and subsequent navigation and targeting information of the companion aircraft.

In some embodiments, the group of companion aircraft includes three or more aircraft, and the target is a non-stationary target (e.g., moving along its own trajectory) while sensed by the companion aircraft from within the GPS-challenged airspace. For example, the aircraft receives state vectors and targeting information from each companion aircraft and determines therefrom a unique relative position of the target. Accordingly, the targeting solution includes vector information corresponding to a trajectory of the target while sensed by the group of companion aircraft from within the GPS-challenged airspace.

In some embodiments, the targeting solution includes a precision navigation solution of the trajectory of the aircraft through the GPS-challenged airspace.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

and FIGS. 7A through 7C are flow diagrams illustrating a method for aircraft-based navigation and targeting according to example embodiments of this disclosure.

DETAILED DESCRIPTION

Figure 1:
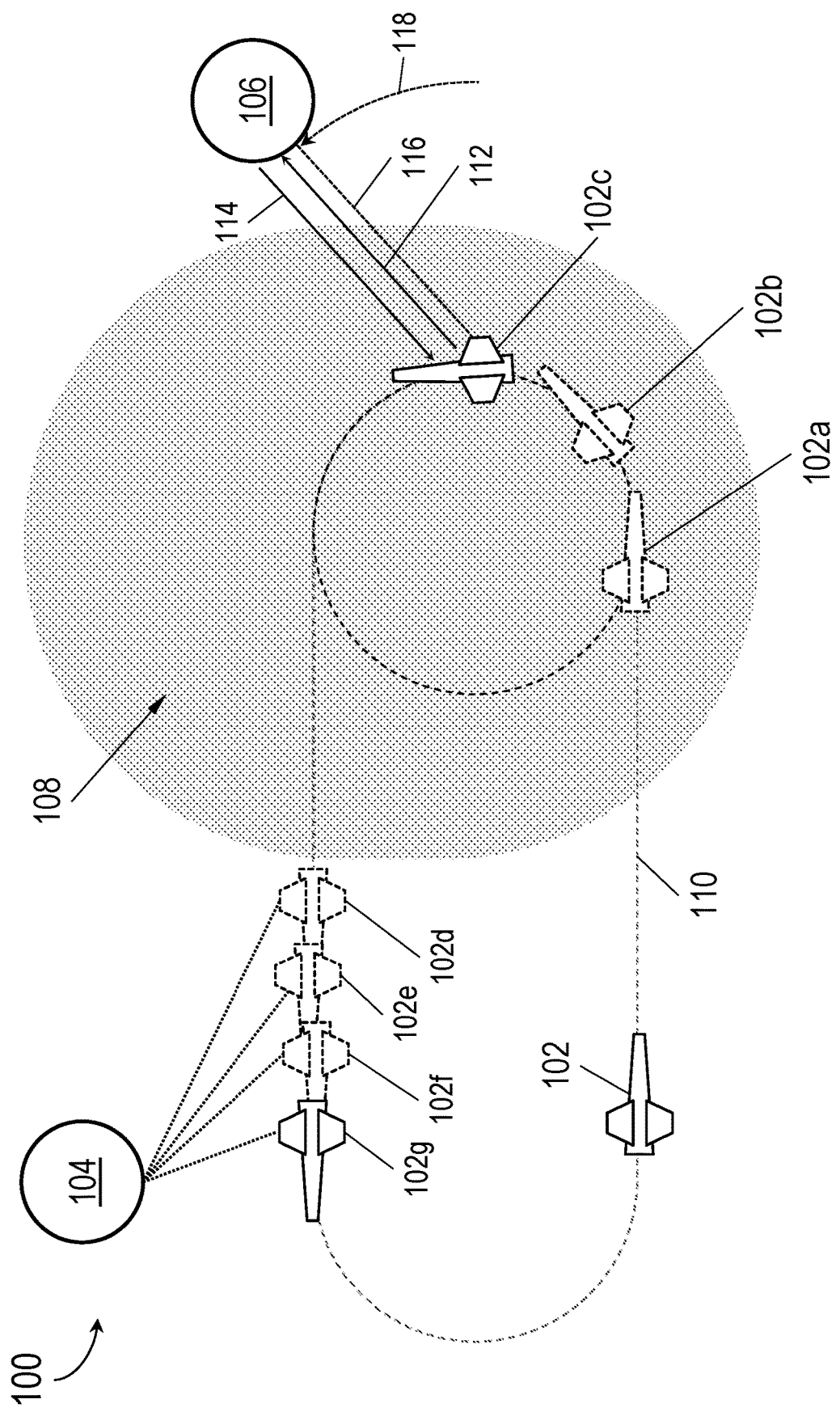
FIG. 1 is a diagrammatic illustration of an aircraft performing targeting operations within a GPS-challenged airspace according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Referring now to FIG. 1, a mission space 100 is shown. The mission space 100 may include aircraft 102, navigational satellite/s 104, a target of interest 106, and a GPS-challenged airspace 108.

In embodiments, the aircraft 102 may determine and maintain a precision position/navigation/time (PNT) solution incorporating an absolute position, e.g., relative to a fixed earth or world frame. For example, the aircraft 102 may receive timing or positioning signals from one or more navigational satellites 104 (e.g., Global Positioning System (GPS), GLONASS, Beidou, Galileo, IRNSS, QZSS), and thereby determine an absolute position of the aircraft.

In embodiments, the aircraft 102 may follow a trajectory 110 (e.g., flight plan) that takes the aircraft through a GPS-challenged airspace 108 associated with the target 106. For example, the aircraft 102 may be a manned aircraft or unmanned aircraft system (UAS) partially or fully controlled by a remote operator. The target 106 may be within, or outside, the GPS-challenged airspace 108. For example, the target 106 may engage in jamming operations, thereby creating the GPS-challenged airspace 108; alternatively, the GPS-challenged airspace may be associated with a geofenced surface area above which the GPS-challenged airspace extends.

In embodiments, the aircraft 102 may observe the target 106 before entering the GPS-challenged airspace 108, while navigating a trajectory 110 through the GPS-challenged airspace, and after exiting or emerging from the GPS-challenged airspace. For example, the aircraft 102 may at regular intervals (e.g., positions along the trajectory 110, each position associated with a position/navigation/time (PNT) solution 102a-c) sense (e.g., receive, observe) observable signals (112) originating at or from, or associated with, the target 106, each observation associated with a time of observation. In some embodiments, the observable signals 112 may include, but are not limited to, passive RF emissions; received RF signals transmitted by the target 106; and/or electro-optical infrared (EO/IR) images captured by, e.g., EO/IR cameras or other like passive sensors. In some embodiments, the observable signals may include reflections of a beam or signal 114 transmitted by a radar system (e.g., surveillance radar, synthetic aperture radar) the aircraft 102, e.g., at a time of transmission (ToT, $t_T$, $t_1$). For example, the ToA or the difference (e.g., time difference of arrival, TDoA) between the ToT and ToA ($t_T-t_4$, $t_1-t_0$) may be used by the aircraft 102 to determine targeting information of the target 106, e.g., a distance 116 and/or direction 118 between the aircraft and the target.

However, if the aircraft 102 is within the GPS-challenged airspace 108, the aircraft may not be able to receive positioning signals from the navigational satellites 104, and thus any targeting information sensed along a trajectory 110 (e.g., at a point) within the GPS-challenged airspace 108 may not be tied to a real-time precision PNT solution of the aircraft. Accordingly, each PNT solution 102a-c determined within the GPS-challenged airspace 108 (and therefore any targeting information associated therewith) may be associated with an estimation error. For example, the aircraft 102 may incorporate onboard inertial reference systems (IRS) capable of determining a state vector incorporating a relative position and/or orientation ("pose") of the aircraft, e.g., relative to an absolute position (102) of the aircraft prior to entering the GPS-challenged airspace 108 or to a prior relative position along the trajectory 110. However, as the aircraft 102 proceeds along the trajectory 110 through the GPS-challenged airspace 108, PNT solutions 102a-c of the aircraft may become progressively less precise and reliable due to drift inherent in the IRS or in clock/timing equipment aboard the aircraft.

In some embodiments, the GPS-challenged airspace 108 may similarly be a communications (comms)-challenged or comms-denied airspace wherein the aircraft 102 may not be able to reliably exchange targeting information, position information, or any other type of information with other aircraft or with ground-based control stations outside the GPS-challenged airspace 108 (e.g., although unmanned aircraft may retain access (which may be limited) to command and control (C2) based messaging).

When the aircraft 102 exits the GPS-challenged airspace 108, the aircraft may resume reception of positioning signals from the navigational satellites 104. Accordingly, the aircraft 102 may resume determination and maintenance of precision PNT solutions 102d-g driven by subsequent absolute positioning of the aircraft in real-time or near real-time (e.g., while the aircraft continues to determine state vectors via the IRS and continues to sense observable signals 112 associated with the target 106). In embodiments, the aircraft 102 may, via its targeting system, correct the estimation errors associated with PNT solutions 102a-c determined within the GPS-challenged airspace 108 via factor graph optimization (FGO) of targeting information and state vectors determined along the trajectory 110 through the GPS-challenged airspace, along with targeting information and state vectors determined subsequent to emerging from the GPS-challenged airspace, based on the subsequent GPS-driven absolute positions informing the precise PNT solutions 102d-g determined subsequent to exiting the GPS-challenged airspace.

Figure 2:
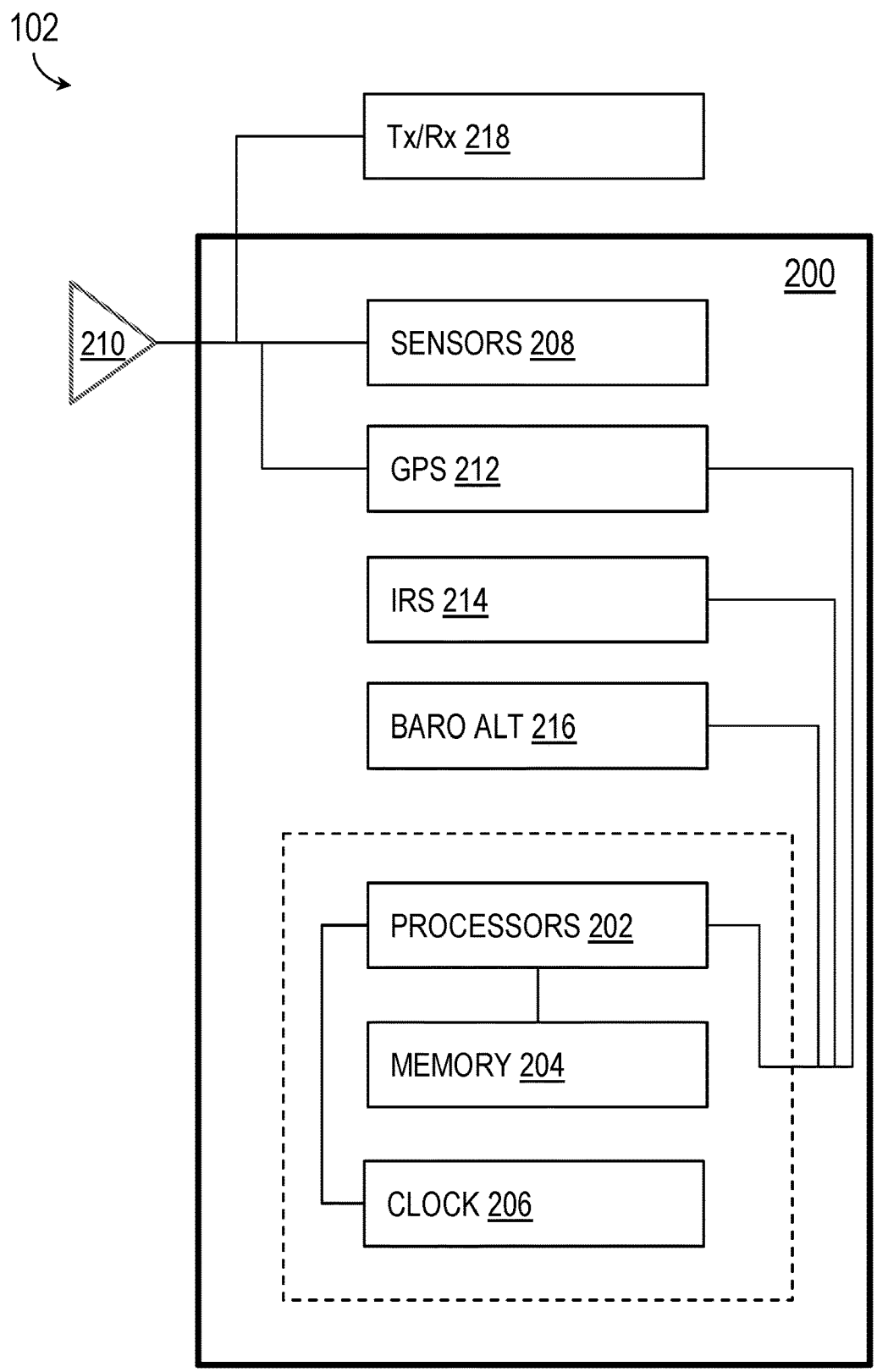
FIG. 2 is a block diagram illustrating components of a targeting system of the aircraft of FIG. 1.

Referring to FIG. 2, the aircraft 102 is shown. The aircraft 102 may include a targeting system 200 incorporating processors 202, memory 204, and precision clock 206; signal sensors 208; antenna elements 210; GPS receiver 212; inertial reference system 214 (IRS); and barometric altimeter 216 (baroalt). The aircraft 102 may further include transmitters and receivers 218 (Tx/Rx) for communications (comms), e.g., with other aircraft and/or ground-based facilities.

In embodiments, the targeting system 200 may process absolute position information determined by the GPS receiver 212, state vector/relative position and orientation information determined by the IRS 214, and/or pressure altitude information sensed by the barometric altimeter 216 to determine and maintain a precision position/navigation/time (PNT) solution of the aircraft 102. By maintaining a precise PNT solution of the aircraft 102, the targeting system 200 may determine and maintain targeting information locating any targets of interest (106, FIG. 1) via signal observation as precisely as possible. For example, targeting information may be forwarded to other aircraft subsystems (e.g., weapons, surveillance, electronic warfare) or to ground-based control stations for coordination with other aircraft. Further, by combining precision PNT solutions with observations of observable signals (112, FIG. 1) associated with the target 106, the targeting system 200 may additionally generate precision targeting solutions associated with location of the target.

In embodiments, the memory 204 may include any appropriate form of data storage known in the art, and may store determined PNT solutions, state vectors, and/or targeting information. For example, if the aircraft 102 is within a GPS-challenged airspace (108, FIG. 1) that is also a comms-denied airspace, e.g., where other aircraft or control stations may not be reachable via the Tx/Rx 218 (e.g., due to hostile jamming, atmospheric conditions, or other factors), PNT solutions determined within the GPS-challenged airspace (e.g., imprecise PNT solutions not based on precise absolute positions of the aircraft) and associated targeting information may be stored to the memory 204 for subsequent correction of the associated position estimation errors and generation of precise targeting solutions (e.g., via factor graph optimization, as described below). In embodiments, an aircraft 102 engaged in multi-ship targeting operations as described in greater detail below may further store to memory 204 positioning, targeting, vectoring, and/or ranging information received from companion aircraft. Additionally, the memory 204 may store encoded instructions for determination of targeting solutions via factor graph optimization as described below.

In embodiments, the precision clock 206 may include high precision time and frequency interface (PTFI) circuitry (e.g., as disclosed by U.S. Pat. No. 9,596,073, which patent is herein incorporated by reference in its entirety) configured for simultaneous high precision synchronization and syntonization of multiple sensors or clocks. For example, the precision clock 206 may receive satellite-referenced time mark signals from the GPS receiver 212, and/or may include an atomic clock (e.g., chip scale atomic clock (CSAC)) for maintaining precise timing in GPS-challenged airspaces (108, FIG. 1). In embodiments, the precision clock 206 may be configured to determine and account for time and frequency offsets with respect to remote systems, e.g., fixed ground stations and/or similar targeting systems aboard companion aircraft in multi-ship targeting operations. For example, as described in greater detail below, multiple aircraft within the GPS-challenged airspace 108, each navigating its own trajectory (110, FIG. 1), may each sense a particular observable signal 112, image, or emission associated with the target 106 at different times of observation, whereby the aircraft 102 may maintain precision inter-platform distance and timing (e.g., via inter-platform two-way timing and ranging (TWTR) and clock synchronization) to indicate a common observation of the target from multiple positions. In embodiments, TWTR, or two-way time transfer (TWTT), operations may be performed as described in U.S. patent application Ser. No. 17/320,707, which application is herein incorporated by reference in its entirety.

In embodiments, the signal sensors 208 may include, but are not limited to, RF sensors, electro-optical infrared (EOIR) cameras, or other passive sensors capable of passive sensing of observable signals 112 originating at the target 106, from which a distance between the aircraft 102 and the target (and/or a direction between the aircraft and the target) may be determined. In some embodiments, signal sensors 208 may include radar assemblies (e.g., surveillance radar, synthetic aperture radar) configured for emitting or transmitting signals or beams (114, FIG. 1) at times of transmission and listening for a reflection or response at a subsequent time of arrival.

In embodiments, the Tx/Rx 218 may be configured for transmission and reception of radio frequency (RF) signals (e.g., communications signals, positioning signals, timing signals, ranging signals) via antenna elements 210.

In embodiments, the IRS 214 may be configured for determining a state vector of the aircraft 102; a state vector may be absolute (e.g., relative to an earth or world frame) or relative (e.g., relative to a body or platform frame of the aircraft). For example, the state vector may include one or more of: a relative position of the aircraft 102 (e.g., relative to a prior absolute position determined by the GPS receiver 212 or to a prior relative position of the aircraft, e.g., within the GPS-challenged airspace 108) and an orientation of the aircraft (e.g., as determined by an accelerometer or like inertial measurement unit (IMU)) in multiple degrees of freedom (e.g., a pitch angle, roll angle, and/or yaw angle (e.g., heading angle) of the aircraft rotationally relative to absolute or relative x-, y-, and z-axes respectively). In some embodiments, a sequence of relative positions and/or orientations (poses) of the aircraft at specific times may determine a relative velocity and/or a relative acceleration of the aircraft 102, or a rate of change with respect to relative position or orientation may be determined by rate gyroscopes or like IMU). In some embodiments, any or all of the above inertial measurements may account for inherent bias or noise associated with the IRS 214, IMU, and/or clock 206. For example, while within the GPS-challenged airspace 108, state vector measurements by the IRS 214 and factor graph optimizations thereof may incorporate bias estimates based on known sensor bias associated with one or more component IMUs.

In embodiments, the GPS receiver 212 may include any like satellite navigation (satnav) based system known in the art capable of receiving positioning signals from navigational satellites (104, FIG. 1) and thereby determining an absolute position of the aircraft 102, e.g., relative to an earth or world frame.

In embodiments, the barometric altimeter 216 (baroalt) may determine a barometric altitude of the aircraft based on the surrounding atmospheric pressure.

Figure 3:
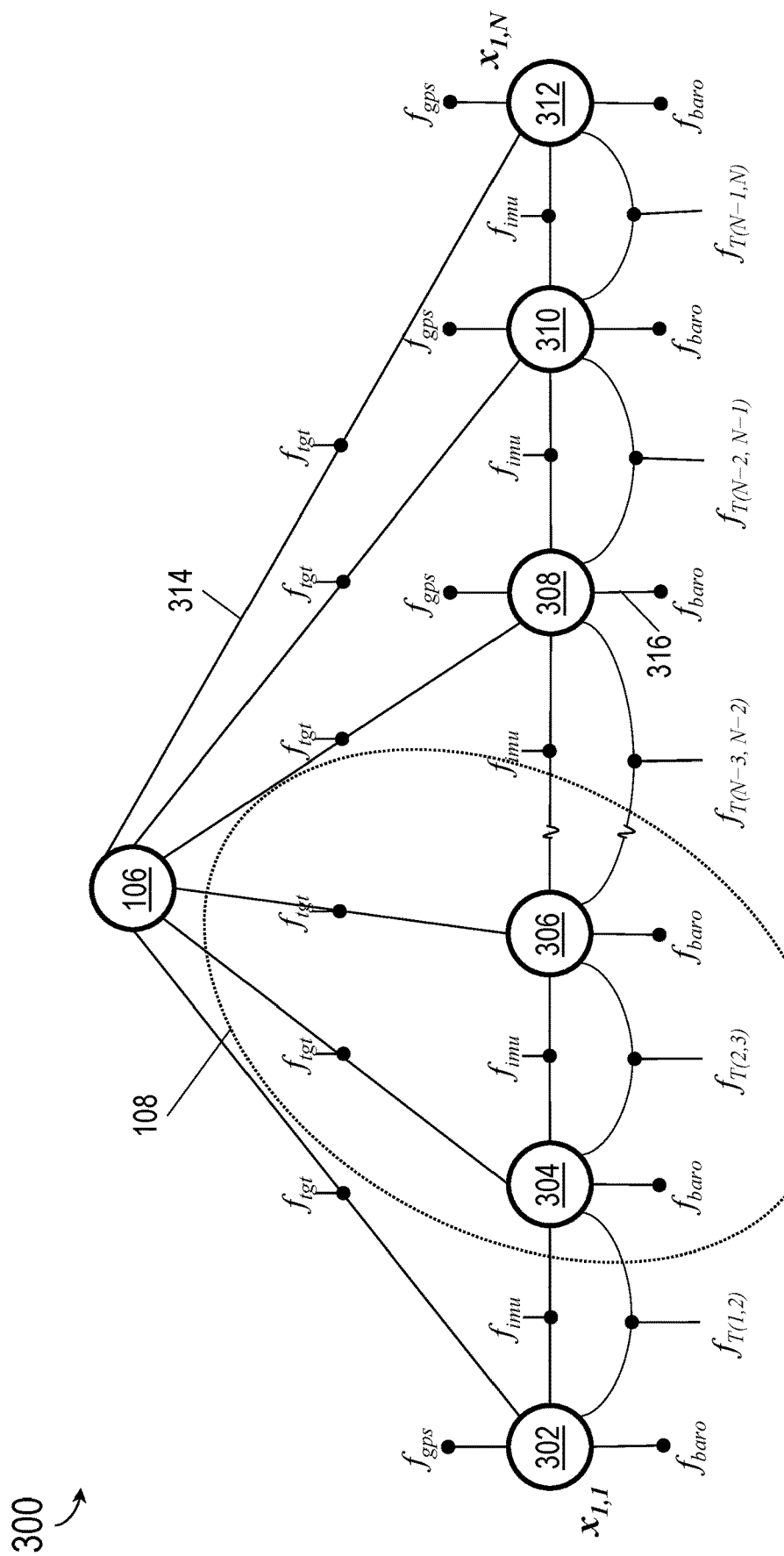
FIG. 3 is a factor graph illustrating navigation and targeting information of the aircraft of FIG. 1.

Referring to FIG. 3, a factor graph 300 is shown.

In embodiments, the movement of the aircraft (102, FIG. 1) through the GPS-challenged airspace 108 and relative to the target of interest 106 may be expressed as a series or sequence of GPS-challenged positions (102a-c, FIG. 1). For example, the aircraft 102 may follow a trajectory (110, FIG. 1) through the GPS-challenged airspace 108, the trajectory comprising a chain of successive positions, each position associated with a GPS-challenged PNT solution 102a-c. Each GPS-challenged PNT solution 102a-c may carry position information of the aircraft 102 at the associated time and may be associated with targeting information and with a state vector, and each pair of consecutive PNT solutions may be linked by a transition from one position and its associated PNT solution to the next position and associated PNT solution.

In embodiments, the targeting system (200, FIG. 2) may characterize the trajectory 110 of the aircraft 102 (prior to entering, while navigating the trajectory within, and subsequent to exiting, the GPS-challenged airspace 108) as a factor graph 300. For example, the factor graph 300 may comprise a series of state nodes 302-312 corresponding to a state set $$X=\{x_{1,1}, x_{1,2}, \ldots x_{1,N}\}$$

of N successive or sequential states of the aircraft 102 along the trajectory 110. Each state node 302-312 may correspond to a factor of the factor graph 300. For example, each state node 302-312 may correspond to a state of the aircraft at a particular time of observation (e.g., corresponding to an observation or sensing of observable signals (112, FIG. 1)) and may include one or more of: targeting information based on the observable signals; an absolute position of the aircraft, which may not be determinable in real time; a relative position, e.g., relative to some prior absolute or relative position of the aircraft; a pressure altitude of the aircraft (e.g., sensed via barometric altimeter (216, FIG. 2)); and/or a state vector of the aircraft, which may be absolute (e.g., expressing an orientation of the aircraft in multiple degrees of freedom relative to an earth frame) or relative (e.g., expressing an orientation of the aircraft relative to its own platform or body reference frame).

In embodiments, the factor graph 300 may include variables appearing in (e.g., contributing to) various factors, the factors represented by state nodes 302-312 of the factor graph and the variables represented by edges 314 or half-edges 316 connecting nodes (e.g., state nodes 302-312 and/or factor nodes) within the factor graph. For example, factors $f_{gps}$ may correspond to absolute position information of the aircraft 102. as determined by the GPS receiver (212, FIG. 2, and which may not be reliably available within the GPS-challenged airspace); factors $f_{baro}$ may correspond to pressure altitudes sensed by the barometric altimeter 216; factors $f_{tgt}$ may correspond to targeting information associated with the target 106 and based on the sensing of observable signals 112 associated with the target; and factors $f_{imu}$ may correspond to changes in state vector of the aircraft between consecutive states corresponding to the state nodes 302-312 (e.g., changes in relative position, orientation (pose), and/or rate from state to state as observed by the IRS 214 and/or its component IMUs.

In some embodiments, each state node 302-312 may be associated with a measurement interval. For example, the factor graph 300 may be associated with loosely coupled absolute position measurements taken by the GPS receiver 212 at 1 Hz (e.g., or tightly coupled measurements taken at more frequent intervals), when such measurements are possible. Similarly, state vectors measured by the IRS 214, pressure altitudes measured by the barometric altimeter 216, and observation of observable signals 112 observed via the signal sensors 208 may each be associated with 1 Hz intervals as coordinated by the precision clock 206 (e.g., whether or not the GPS receiver 212 is capable of receiving positioning signals).

In embodiments, each successive pair of state nodes (x, x+1) 302-312 of the factor graph 300 may further be directly connected by a state transition factor $f_{T(N-2, N-1)}$ corresponding to the transition of the aircraft 102 between a state and the state immediately subsequent (e.g., state nodes 308, 310) and incorporating any changes in absolute position, relative position/orientation or change thereof, pressure altitude, and/or targeting information between the two states. For example, the factor $f_{imu}$ may approximate the transition between successive states but may not precisely or accurately capture in real time the transition between states, e.g., due to inherent drift and/or bias associated with the IRS 214 and/or the precision clock 206. In some embodiments, measurements associated with the IRS 214, and/or factor graph optimizations thereof, may estimate or account for known or estimated sensor bias of the IRS.

In embodiments, the state nodes 304 and 306 may correspond to a time horizon when the aircraft 102 is navigating a trajectory 110 within the GPS-challenged airspace 108 and may therefore be unable to reliably or accurately determine an absolute position of the aircraft via the GPS receiver 212 (although sensing of observable signals 112 and determination of state vectors may continue). Accordingly, the state nodes 304 and 306 may each be directly connected to a targeting information factor $f_{tgt}$ (corresponding to an observation or sensing of observable signals 112 associated with the target 106 at each state, from which may be derived targeting information, e.g., a distance and/or direction between the aircraft and the target at each state), to a factor $f_{baro}$ (corresponding to a sensed pressure altitude at each state), and to a factor $f_{imu}$ (corresponding to a change in pose relative to a prior state 302, 304) but not directly connected to a factor $f_{gps}$ (as no corresponding absolute position may be determinable within the GPS-challenged airspace 108). Accordingly, the state nodes 304 and 306 (as well as the position/navigation/time (PNT) solutions of the aircraft 102 and targeting information corresponding thereto) may each be associated with a degree of position estimation error (due to inherent drift introduced by e.g., each factor $f_{imu}$).

In embodiments, the state nodes 308, 310, 312 may each be associated with states (102d-102g, FIG. 1) of the aircraft 102 after exiting/emerging from the GPS-challenged airspace 108. For example, each state node 308, 310, 312 may be directly connected to a factor $f_{gps}$ (in addition to factors $f_{baro}$, $f_{imu}$, and $f_{tgt}$) and may therefore be associated with a precision PNT solution 102d-102g of the aircraft 102.

In embodiments, the targeting system (200, FIG. 2) may perform factor graph optimization of the state nodes 304, 306 (e.g., and their associated state vectors and targeting information) based on the GPS-driven subsequent absolute positions, subsequent state vectors, and subsequent targeting information associated with state nodes 308, 310, 312 for non-linear optimization of a targeting solution locating the target 106 (e.g., via direction (116, FIG. 1) and/or distance (118, FIG. 1)) between the aircraft 102 and the target) associated with state nodes 304, 306 and targeting information sensed within the GPS-challenged airspace 108, thereby solving the factor graph 300 for a precision (e.g., geolocated) targeting solution of the target relative to the prior trajectory 110 of the aircraft through the GPS-challenged airspace. For example, factor graph optimization may be loosely coupled (LC) or tightly coupled (LC) and may incorporate any appropriate smoothing and mapping implementation for integration of subsequent absolute positions and state vectors. For example, FGO integration may incorporate GPS/absolute position factors $f_{gps}$, relative state vector factors $f_{imu}$, and pressure altitude factors $f_{baro}$, solving for state nodes 304, 306 of an optimal state set X wherein the corresponding targeting information factors $f_{tgt}$ are associated with a refined or precision (e.g., geolocated) PNT solution of the aircraft 102 at sensing points (102a-102c) along its trajectory 110 through the GPS-challenged airspace 108. In some embodiments, factor graph optimization may further include estimates of sensor bias associated with, e.g., the IRS 214 and/or the precision clock 206.

In some embodiments, the factor graph 300 may additionally be solved for one or more precise position/navigation/time (PNT) solutions of the aircraft 102 along its trajectory 110 through the GPS-challenged airspace 108. For example, the one or more precise PNT solutions may refine (e.g., geolocate) the trajectory 110 of GPS-challenged PNT solutions (102a-102c, FIG. 1) determined by the aircraft 102 within the GPS-challenged airspace 108.

Figure 4:
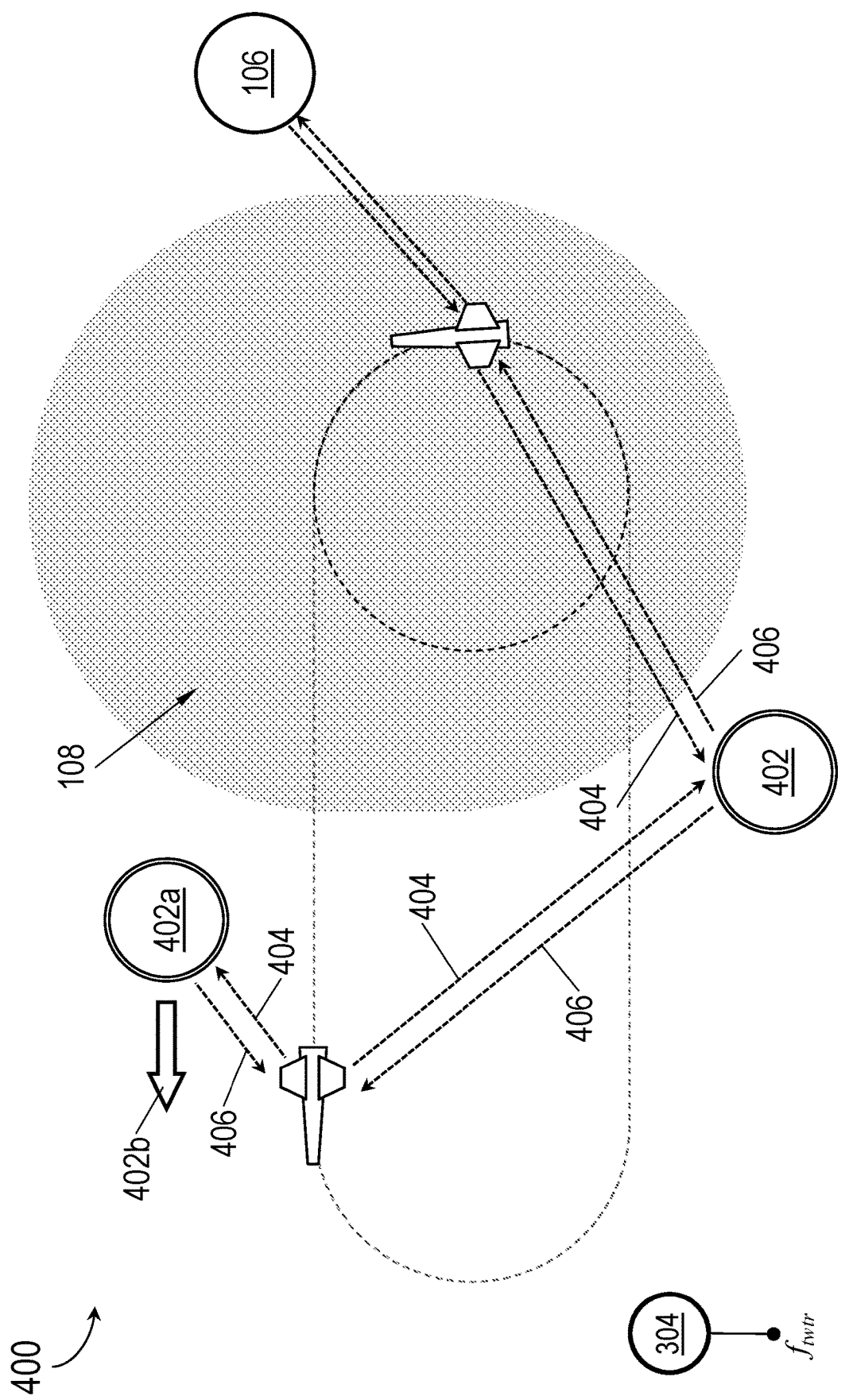
FIG. 4 is a diagrammatic illustration of the GPS-challenged airspace of FIG. 1, wherein the aircraft of FIG. 1 receives additional position information via two-way timing and ranging (TWTR) with a ground station.

Referring now to FIG. 4, the mission space 400 may be implemented and may function similarly to the mission space 100, except that within the mission space 400, the aircraft 102 may incorporate additional radio ranging measurements relative to a ground station 402 having a fixed location known to the aircraft 102 (e.g., stored to memory 204). In some embodiments, the ground station 402 may be a mobile station 402a, e.g., configured for transmission of its current precision PNT solution along its course (402b); for example, the ground station may change location but may remain outside the GPS-challenged airspace 108.

In embodiments, the aircraft 102 may (e.g., at 1 Hz intervals, as described above) perform two-way timing and ranging (TWTR) by transmitting ranging signals 404 (e.g., via the Tx/Rx 218) at a time of transmission (ToT). Ranging signals 404 may be reflected or responded to (406) by the ground station/s 402. 402a, and the reflection/response received by the aircraft 102 at a time of arrival (ToA). By coordinating any variations in timing and frequency between the targeting system (200, FIG. 2) and the ground station/s 402, 402a (e.g., via the precision clock 206), the aircraft 102 may determine and maintain a distance and/or direction relative to the known location/s of the ground station/s 402, 402a throughout the mission space 400, refining the position/navigation/time (PNT) solution of the aircraft even within the GPS-challenged airspace 108 when absolute positioning via the GPS receiver (212, FIG. 2) is unavailable. Similarly, in embodiments two-way timing and ranging may introduce a new factor (e.g., $f_{twtr}$) to each state node 304 of the factor graph 300; for example, solving for a targeting solution or navigation solution via optimization of the factor graph 300 may additionally incorporate factors $f_{twtr}$ associated with two-way timing and ranging measurements (e.g., at 1 Hz intervals) throughout the trajectory 110 through, and subsequent to exiting, the GPS-challenged airspace 108 (e.g., to the extent that such measurements are possible).

Figure 5:
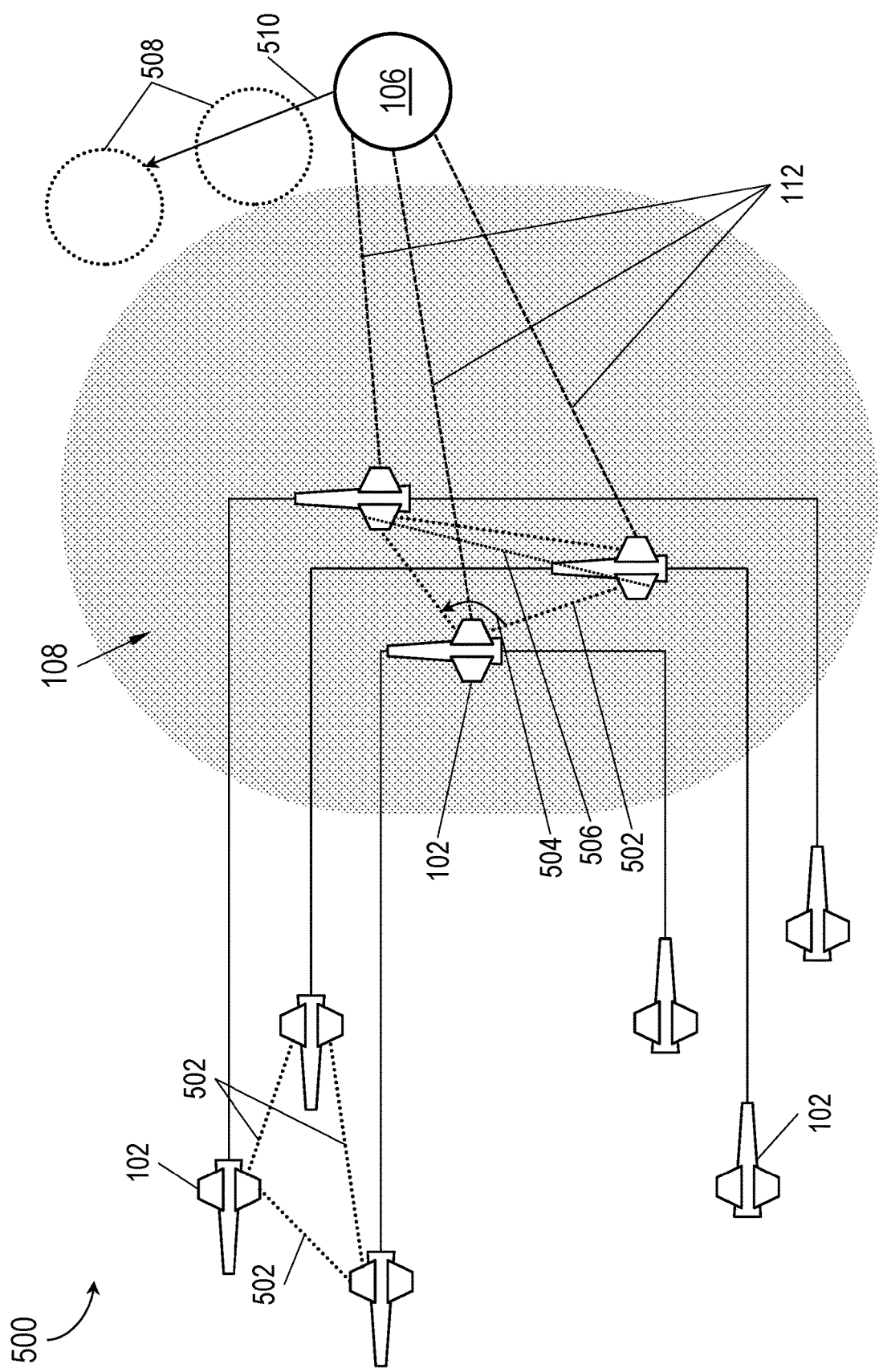
FIG. 5 is a diagrammatic illustration of multi-aircraft targeting operations within the GPS-challenged airspace of FIG. 1.

Referring now to FIG. 5, the mission space 500 may be implemented and may function similarly to the mission spaces 100, 400 of FIGS. 1 and 4, except that within the mission space 500, multiple aircraft 102 may enter the GPS-challenged airspace 108, each individual aircraft sensing observable signals 112 (e.g., RF emissions, signal/beam reflections, and/or EO/IR imagery, as described above) from the target 106 prior to entering, while navigating, and subsequent to exiting/emerging from the GPS-challenged airspace. For example, each aircraft 102 may navigate a trajectory 110 through the GPS-challenged airspace 108 while sensing observable signals 112 at distinct times of observation but may maintain relative distance and timing among each other via synchronization of the precision clocks (206, FIG. 2) aboard each aircraft and/or via inter-platform two-way timing and ranging (TWTR) 502 and Time Difference of Arrival (TDoA) operations, thereby tracking common observations of a particular observable signal at offset times by each individual aircraft at a particular position relative to its trajectory.

In embodiments, one or more aircraft 102 receive ownship position information (e.g., absolute state vectors, pressure altitudes, absolute positions where available) and corresponding targeting information from its companion aircraft, storing any received position and targeting information from companion aircraft to memory (204, FIG. 2). For example, in some embodiments one aircraft 102 of the group will receive position and targeting information from its companion aircraft and generate a targeting solution after exiting the GPS-challenged airspace 108; alternatively, multiple aircraft of a group may receive position and targeting information and generate their own targeting solutions. Further, in embodiments each aircraft 102 may at intervals (e.g., 1 Hz) perform two-way timing and ranging 502 (TWTR) with each companion aircraft to maintain precise inter-platform distance, direction, and timing before entering, navigating through, and after emerging from the GPS-challenged airspace 108, synchronizing time between aircraft via each precision clock 206. For example, ownship position and targeting information may be passed among aircraft 102 if the GPS-challenged airspace 108 is not a comms-denied airspace; otherwise, ownship position and targeting information may be stored to memory 204 aboard the sensing aircraft and passed to companion aircraft once comms are restored. In embodiments, each aircraft 102 incorporating a targeting system 200 or determining a targeting solution may convert absolute state vectors received from companion aircraft into relative state vectors, e.g., relative to the platform frame of the receiving aircraft.

In some embodiments, the group of N companion aircraft 102 may maintain a formation wherein the geometry of each aircraft relative to each other aircraft provides for optimal TWTR (502) and thereby enhances the accuracy of any refined targeting information sensed from within the GPS-challenged airspace 108 (e.g., relative to a particular trajectory 110). For example, the geometry of the group of N companion aircraft 102 may provide for at least one maximally obtuse angle 504 associated with a long baseline distance 506 between companion aircraft. Similarly, the accuracy of the refined or precision targeting solution may be increased by groups of N companion aircraft 102 having either or both of 1) a larger N, or 2) a larger number of obtuse angles 504 and/or long baseline distances 506 between companion aircraft.

Figure 6:
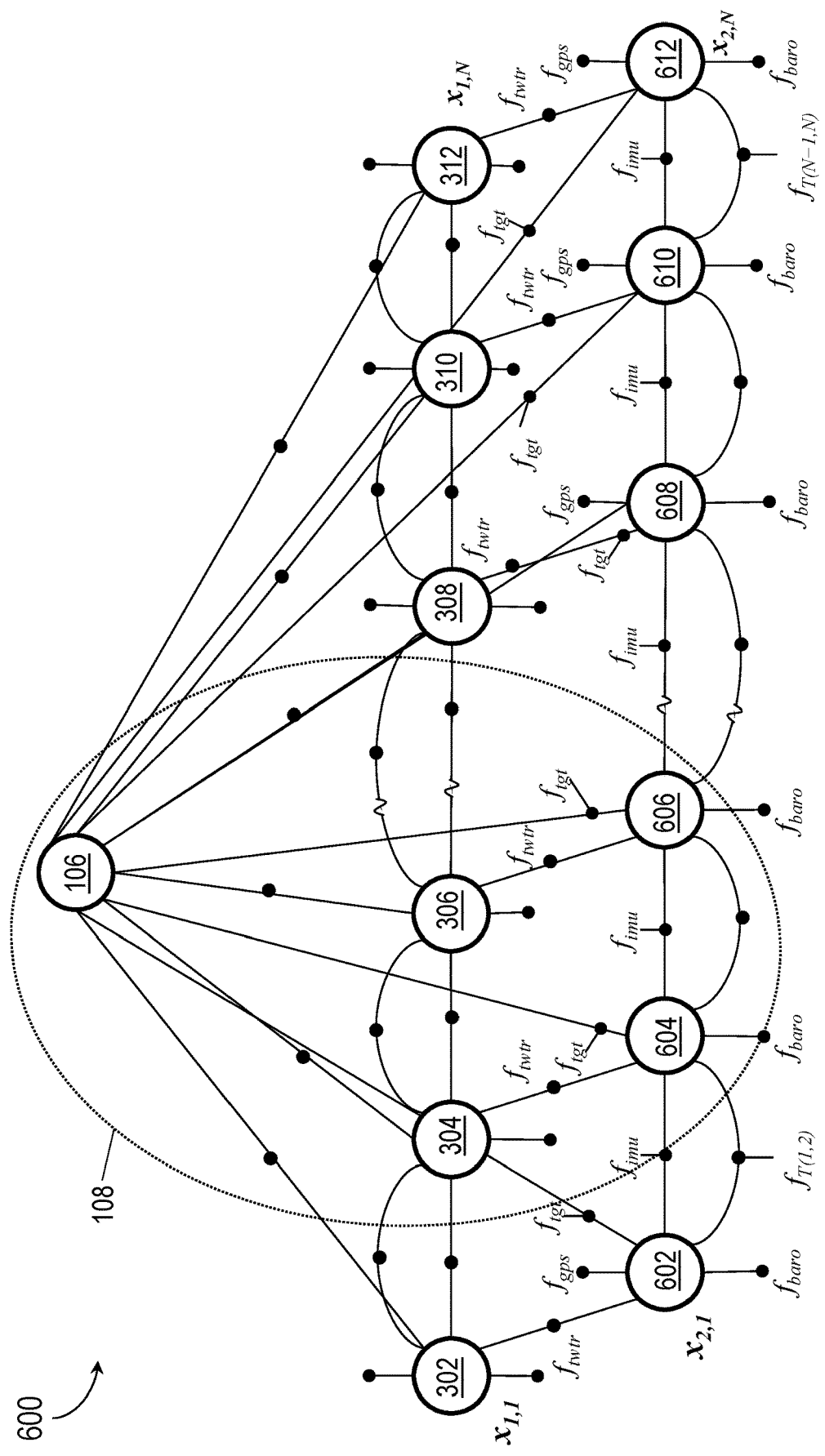
FIG. 6 is a factor graph corresponding to the multi-aircraft targeting operations of FIG. 5.

Referring also to FIG. 6, the factor graph 600 may be implemented and may function similarly to the factor graph 300 of FIG. 3, except that the factor graph 600 may include, in addition to the state nodes 302-312, state nodes 602-612, each additional set of state nodes 602-612 corresponding to a state set $X_1, X_2, \ldots X_N$ and to a sequence of states for each of a group of N companion aircraft 102. In embodiments, each individual state set $X_1=\{X_{1,1} \ldots X_{1,N}\}$, $X_2=\{X_{2,1} \ldots X_{2,N}\}$, $X_N$ may be solved as described above, via factor graph optimization of the set of position factors $f_{gps}$, state vector factors $f_{imu}$, targeting information factors $f_{tgt}$, and pressure altitude factors $f_{baro}$, specific to each aircraft 102 and further including ranging factors $f_{twtr}$ corresponding to a distance and/or direction between each of the companion aircraft as determined by two-way timing and ranging (TWTR) among the companion aircraft at each measurement interval. For example, factor graph optimization may result in up to N refined targeting solutions for the target 106, each refined targeting solution relative to the trajectory of each individual aircraft 102.

Referring back to FIG. 5, in embodiments one or more aircraft 102 of the group of N companion aircraft (e.g., if N≥3) may determine at each measurement interval, via a combination of sensing observable signals 112 associated with of the target 106 and TWTR operations 502 among the group of companion aircraft, a unique relative position 508 of the target 106. For example, the unique relative position of the target 106 may be determined via triangulation of the relative distances between the target and each aircraft 102 as derived from targeting information sensed by each aircraft. In embodiments, if the target 106 is a non-stationary target, the group of N companion aircraft 102 may determine relative vector information 510 of the target which may be later refined in the targeting solution by factor graph optimization of GPS-challenged state vectors and targeting information of each aircraft based on the subsequent absolute positions, subsequent state vectors, and subsequent targeting information of each aircraft to refine the trajectory 110 of each companion aircraft, as described above. For example, targeting information associated with a sequence of unique relative positions 508 of the target 106 may provide direction, velocity, and/or acceleration information corresponding to the movement of the target while sensed by the aircraft 102 within the GPS-challenged airspace 108.

Figure 7A:
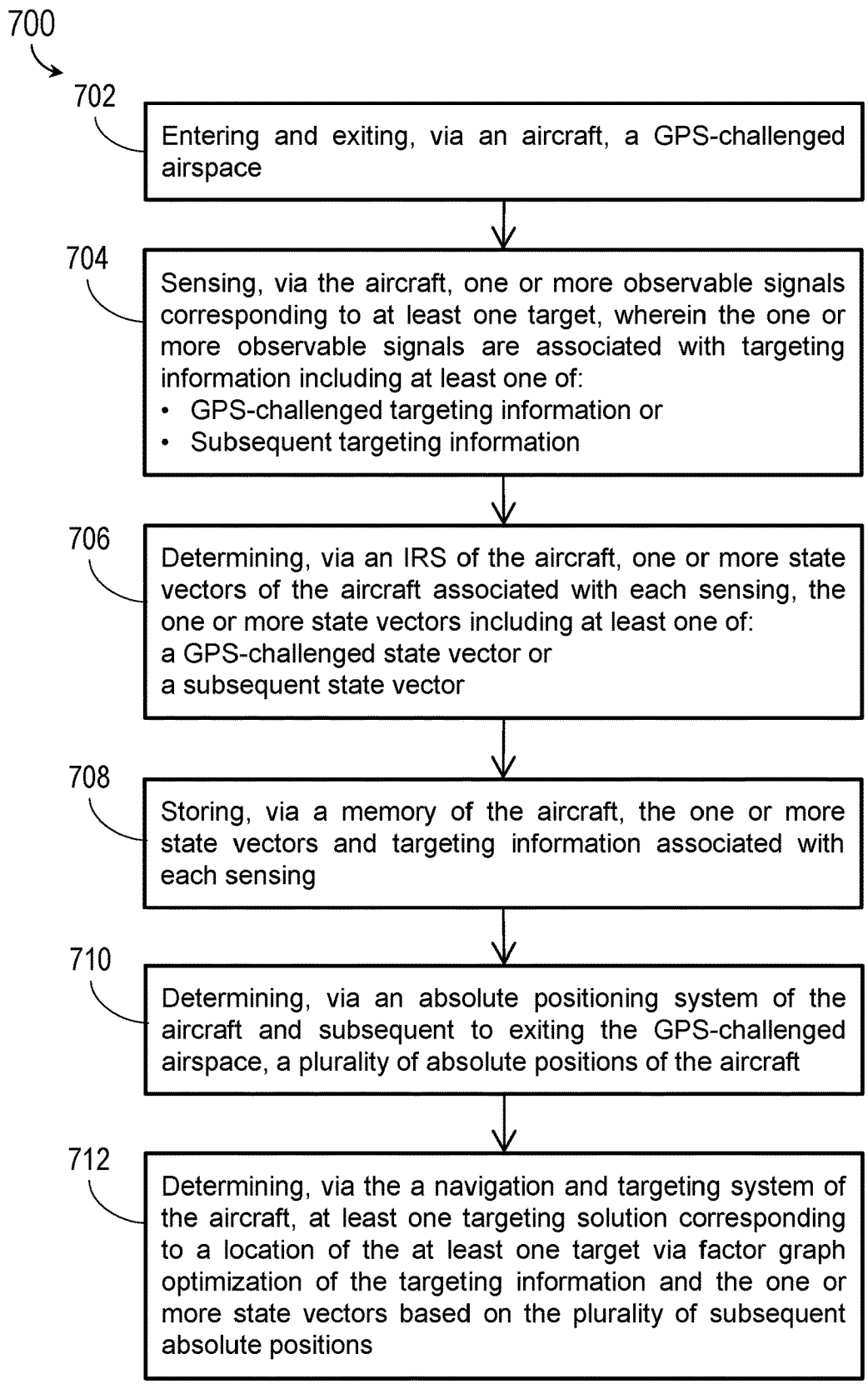

Referring now to FIG. 7A, the method 700 may be implemented by the targeting system 200 of the aircraft 102 and may include the following steps.

At a step 702, the aircraft enters a GPS-challenged airspace, navigates a trajectory through the GPS-challenged airspace, and exits the GPS-challenged airspace. In some embodiments, the GPS-challenged airspace may be a GPS-denied airspace where satellite-based navigational signals for determining an absolute position of the aircraft may not be available.

At a step 704, the aircraft, while navigating a trajectory within the GPS-challenged airspace, senses observable signals (e.g., RF emissions, RF signals, EO/IR imagery) associated with a target of interest. For example, the target of interest corresponds to a target location (which may or may not be within the GPS-challenged airspace) and each observable signal may be observed at a particular time of observation, from which targeting information relating to the location of the target (e.g., a distance and/or direction of the target relative to the aircraft) may be derived. In some embodiments, the observable signals are passively sensed (e.g., via EO/IR cameras or other like passive sensors); alternatively, the observable signals include reflections of beams or signals (e.g., surveillance radar, synthetic aperture radar) transmitted or emitted by the aircraft.

At a step 706, an inertial reference system (IRS) aboard the aircraft determines state vectors of the aircraft corresponding to each time of observation. For example, target observations and state vector determinations may be conducted at regular intervals (e.g., 1 Hz). State vectors may be absolute (e.g., in the earth frame) or relative (e.g., in an aircraft-specific platform frame) and including one or more of: a relative position of the aircraft (including a position estimation error based on inherent drift of the IRS and/or clock); an orientation of the aircraft in multiple degrees of freedom (e.g., pitch, roll, heading/yaw); a pressure (e.g., barometric) altitude; and/or a rate of change of any other component.

At a step 708, a navigation and targeting system of the aircraft stores determined targeting information and corresponding state vectors for each sensing to memory.

At a step 710, after the aircraft has exited the GPS-challenged airspace, the GPS or other satellite-based absolute position receiver determines a set of multiple absolute positions, while the IRS continues to determine subsequent state vectors and sensors collect subsequent targeting information by sensing observable signals of the target.

At a step 712, the navigation targeting system determines a targeting solution relative to the target (e.g., a refined geolocation of targeting information determined while the aircraft was navigating the trajectory through the GPS-challenged airspace) via factor graph optimization of the set of GPS-challenged state vectors and GPS-challenged targeting information corresponding to the sensing of observable signals from of the target from within the GPS-challenged airspace based on the set of subsequent absolute positions of the aircraft (and, e.g., the subsequent state vectors and subsequent targeting information corresponding thereto). In some embodiments, the targeting solution includes a navigational solution refining one or more position/navigation/time (PNT) solutions of the aircraft corresponding to its trajectory through the GPS-challenged airspace.

Figure 7B:
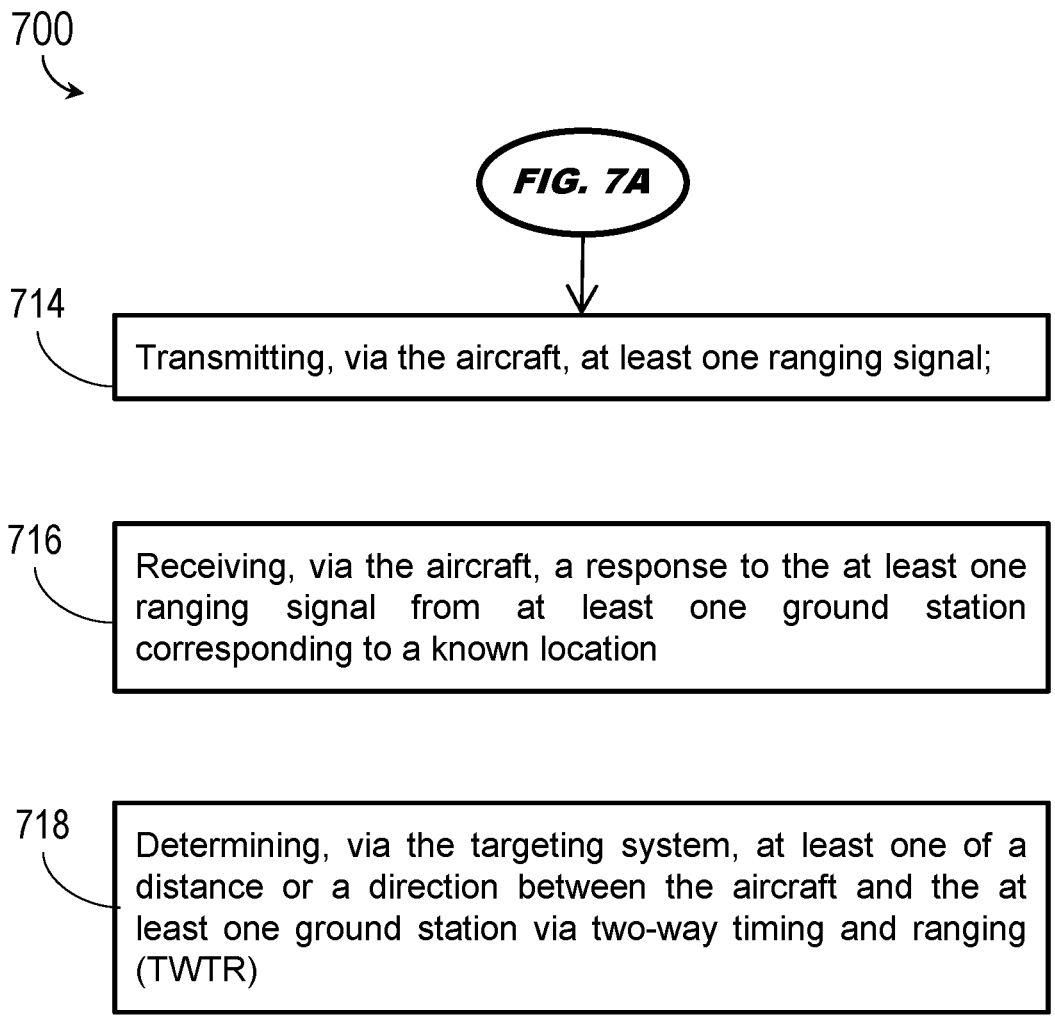

Referring now to FIG. 7B, the method 700 may include additional steps 714 through 718. At the step 714, the aircraft transmits a timing or ranging signal at a time of transmission (ToT) toward one or more ground stations associated with a fixed location known to the targeting system (e.g., stored to memory). In some embodiments, the ground station/s is/are not fixed in location; mobile ground stations maintain a current precision PNT solution along their trajectory or course.

At a step 71, the aircraft receives a response to the timing or ranging signal from the ground station.

At a step 718, the targeting system determines, via two-way timing and ranging (TWTR), a distance and/or direction between the aircraft and the ground station/s, such that determining the targeting solution via factor graph optimization further refines GPS-challenged and/or subsequent PNT solutions of the aircraft based on TWTR operations with the ground station/s.

Referring now to FIG. 7C, the method 700 may include additional steps 720 through 726. At the step 720, when the aircraft is one of a group of companion aircraft, the aircraft receives state vectors from each companion aircraft in the group, including GPS-challenged state vectors corresponding to the trajectories of the companion aircraft through the GPS-challenged airspace and subsequent state vectors corresponding to sensings of the target by the companion aircraft after emerging from the GPS-challenged airspace. For example, the aircraft may receive absolute state vectors from each companion aircraft, converting each absolute state vector into a relative state vector based in the aircraft's own platform reference frame.

At a step 722, the aircraft receives targeting information from each companion aircraft, including GPS-challenged targeting information corresponding to each GPS-challenged state vector and subsequent targeting information corresponding to each subsequent state vector (e.g., sensed after emerging from the GPS-challenged airspace).

At a step 724, the aircraft receives subsequent absolute positions from each companion aircraft, the subsequent absolute positions corresponding to the subsequent targeting information.

At the step 726, the aircraft performs two-way timing and ranging (TWTR) with each companion aircraft to maintain distance and/or direction information with the companion aircraft. For example, TWTR operations may include clock synchronization to resolve different observation times of a common observable signal by companion aircraft within the group. Determination of a targeting solution by the aircraft via factor graph optimization of state vectors and targeting information based on subsequent absolute positioning (and corresponding state vectors and targeting information) may further incorporate positioning and targeting information received from the companion aircraft.

In embodiments, the targeting system may, compared to conventional EKF-driven implementations, achieve more accurate targeting information sensed by the aircraft within the GPS-challenged or GPS-denied airspace by correcting inherent IRS drift (based on new information sensed after GPS returns) over longer time horizons or through GPS-challenged environments where conventional Gaussian noise assumptions may not apply. Additionally, Factor Graph optimization is better able to handle the large departures from the linearization point that may occur as error estimates become large over longer outages. The nonlinear optimization approach allows for relinearization at multiple iterations during the solving of the factor graph.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A method for aircraft-based targeting in global positioning system (GPS)-challenged airspaces, the method comprising:
    navigating at least one trajectory, via an aircraft, through a GPS-challenged airspace;
    sensing, via the aircraft, one or more observable signals corresponding to at least one target, wherein the one or more observable signals are associated with targeting information including at least one of:
        GPS-challenged targeting information associated with sensing while the aircraft is within the GPS-challenged airspace;
        or
        subsequent targeting information associated with sensing subsequent to exiting the GPS-challenged airspace, each subsequent targeting information associated with an absolute position of the aircraft;
    determining, via an inertial reference system (IRS) of the aircraft, one or more state vectors of the aircraft associated with each sensing, the one or more state vectors including at least one of:
        a GPS-challenged state vector associated with sensing while the aircraft is within the GPS-challenged airspace;
        or
        a subsequent state vector associated with sensing subsequent to exiting the GPS-challenged airspace, each subsequent state vector relative to an absolute position of the aircraft;
    storing, via a memory of the aircraft, the one or more state vectors and the targeting information associated with each sensing;
    and
    determining, via a navigation and targeting system of the aircraft, at least one targeting solution corresponding to a location of the at least one target via factor graph optimization of the targeting information and the one or more state vectors based on the plurality of subsequent absolute positions.

2. The method of claim 1, wherein determining, via an inertial reference system (IRS) of the aircraft, one or more state vectors of the aircraft associated with each sensing includes determining one or more of:
    a relative position of the aircraft, the relative position relative to at least one of 1) a prior absolute position of the aircraft or 2) a prior relative position of the aircraft;
    an orientation of the aircraft, the orientation including one or more of a pitch angle, a roll angle, or a heading angle;
    or
    an altitude of the aircraft.

3. The method of claim 2, determining, via an inertial reference system (IRS) of the aircraft, one or more state vectors of the aircraft associated with each sensing includes determining at least one rate of change associated with one or more of the relative position or the orientation.

4. The method of claim 1, wherein sensing, via the aircraft, one or more observable signals corresponding to at least one target includes:
    sensing one or more of a received radio frequency (RF) signal, an observed RF emission, or an observed electro-optical infrared (EO/IR) emission via one or more passive sensors of the aircraft.

5. The method of claim 1, wherein sensing, via the aircraft, one or more observable signals corresponding to at least one target includes:
    transmitting, via the aircraft, one or more of a signal or a beam;
    wherein the one or more observable signals are associated with a reflection by the target of the transmitted signal or beam.

6. The method of claim 1, further comprising:
    transmitting, via the aircraft, at least one ranging signal;
    receiving, via the aircraft, a response to the at least one ranging signal from at least one ground station corresponding to a known location;
    determining, via the targeting system, at least one of a distance or a direction between the aircraft and the at least one ground station via two-way timing and ranging (TWTR);
    wherein
    determining, via the targeting system, at least one targeting solution includes determining the at least one targeting solution via factor graph optimization based on the at least one distance or direction.

7. The method of claim 1, wherein the aircraft is a first aircraft, the one or more state vectors are first state vectors, the targeting information is first targeting information, and the plurality of subsequent absolute positions is a first plurality of subsequent absolute positions, further comprising:
receiving, subsequent to exiting the GPS-challenged airspace, one or more second state vectors from at least one second aircraft, the one or more second state vectors including GPS-challenged state vectors and subsequent state vectors corresponding to the at least one second aircraft;
receiving, subsequent to exiting the GPS-challenged airspace, second targeting information from the at least one second aircraft, the second targeting information including GPS-challenged targeting information and subsequent targeting information corresponding to the at least one second aircraft;
receiving, subsequent to exiting the GPS-challenged airspace, one or more second subsequent absolute positions from the at least one second aircraft; and
determining at least one vector between the first aircraft and the at least one second aircraft via two-way timing and ranging (TWTR), the at least one vector associated with one or more of a direction or a distance;
wherein
determining, via the targeting system, at least one targeting solution corresponding to a location of the at least one target via factor graph optimization of the targeting information and the one or more state vectors based on the plurality of subsequent absolute positions includes:
determining the at least one targeting solution via factor graph optimization of the first and second target information and the one or more first and second state vectors based on the plurality of first and second subsequent absolute positions and the at least one vector.

8. The method of claim 7, wherein the at least one second aircraft comprises two or more second aircraft, wherein the target is a non-stationary target associated with more than one target location, and wherein:
receiving the one or more second state vectors from the at least one second aircraft includes determining at least one relative position of the target based on a first GPS-challenged first state vector and the associated one or more second GPS-challenged second state vectors; and
determining, via the targeting system, at least one targeting solution corresponding to the target location includes determining vector information corresponding to a trajectory of the target.

9. The method of claim 1, wherein:
the at least one trajectory is associated with a sequence of GPS-challenged positions associated with each sensing within GPS-challenged airspace; and
determining, via the targeting system, at least one targeting solution corresponding to a location of the at least one target via factor graph optimization of the targeting information and the one or more state vectors based on the plurality of subsequent absolute positions includes:
determining, via the targeting system, at least one precision navigation solution corresponding to the aircraft by refining position information corresponding to one or more GPS-challenged positions.

10. An aircraft configured for entering and exiting at least one GPS-challenged airspace, comprising:
at least one sensor configured to sense one or more observable signals corresponding to at least one target, the one or more observable signals are associated with targeting information including at least one of:
GPS-challenged targeting information associated with at least one GPS-challenged sensing while the aircraft is navigating at least one trajectory through a GPS-challenged airspace;
or
subsequent targeting information associated with at least one sensing subsequent to the aircraft exiting the GPS-challenged airspace, each subsequent targeting information associated with an absolute position of the aircraft;
at least one inertial reference system (IRS) configured to determine one or more state vectors of the aircraft associated with each sensing, the at least one state vector including at least one of:
a GPS-challenged state vector associated with sensing while the aircraft is navigating the at least one trajectory through the GPS-challenged airspace;
or
a subsequent state vector associated with sensing subsequent to the aircraft exiting the GPS-challenged airspace, each subsequent state vector associated with an absolute position of the aircraft;
at least one absolute positioning system configured to determine the at least one absolute position of the aircraft based on one or more received positioning signals;
and
wherein the aircraft further comprises a navigation and targeting system comprising:
at least one processor in communication with the absolute positioning system and with the IRS;
a memory in communication with the at least one processor, the memory configured for storage of:
the targeting information and the one or more state vectors associated with each sensing;
and
instructions executable by the at least one processor;
the instructions configured for causing the at least one processor to determine, subsequent to the aircraft exiting the GPS-challenged airspace and via factor graph optimization of the targeting information and the one or more state vectors based on the plurality of subsequent absolute positions, at least one targeting solution corresponding to a location of the at least one target.

11. The aircraft of claim 10, wherein the IRS comprises one or more of:
an accelerometer configured to determine an orientation of the aircraft, the orientation including one or more of a pitch angle, a roll angle, or a heading angle;
a rate gyroscope configured to determine at least one rate of change associated with the orientation;
or
a barometric altimeter configured to determine a pressure altitude of the aircraft;
and wherein each state vector includes one or more of a relative position of the aircraft, the orientation of the aircraft, the at least one rate of change, or the pressure altitude of the aircraft.

12. The aircraft of claim 10, wherein:

the at least one sensor includes at least one passive sensor; and wherein the one or more observable signals include at least one of a received radio frequency (RF) signal, an observed RF emission, or an observed electro-optical (EO/IR) emission.

13. The aircraft of claim 10, further comprising:

at least one transmitter/receiver (Tx/Rx) configured to:
  transmit at least one ranging signal;
  receive at least one response to the ranging signal from at least one ground station corresponding to a known location;
and
wherein the navigation and targeting system is configured to:
  determine at least one vector between the aircraft and the ground station via two-way timing and ranging (TWTR) based on the ranging signal and the response;
  and
  determine the at least one targeting solution via factor graph optimization based on the at least one distance or direction.

14. The aircraft of claim 10, wherein the aircraft is a first aircraft, the one or more state vectors are first state vectors, the targeting information is first targeting information, and the plurality of subsequent absolute positions is a first plurality of subsequent absolute positions, and wherein the targeting system is configured for:

receiving one or more second state vectors from at least one second aircraft, the one or more second state vectors including GPS-challenged state vectors and subsequent state vectors corresponding to the at least one second aircraft;

receiving second targeting information from the at least one second aircraft, the second targeting information including GPS-challenged targeting information and subsequent targeting information corresponding to the at least one second aircraft;

receiving one or more second subsequent absolute positions from the at least one second aircraft;

determining at least one vector between the first aircraft and the at least one second aircraft via two-way timing and ranging (TWTR), the at least one vector associated with one or more of a direction or a distance;

and determining the at least one targeting solution via factor graph optimization of the first and second target information and the one or more first and second state vectors based on the plurality of first and second subsequent absolute positions and the at least one vector.

15. The aircraft of claim 10, wherein:

the at least one trajectory comprises a sequence of GPS-challenged positions of the aircraft, each GPS-challenged position associated with a GPS-challenged sensing;

and wherein the at least one targeting solution includes at least one precision navigation solution corresponding to the trajectory of the aircraft within the GPS-challenged airspace.

* * * * *